(12) United States Patent
Skorupa

(10) Patent No.: US 10,344,882 B2
(45) Date of Patent: Jul. 9, 2019

(54) CHECK VALVE

(71) Applicant: Hamilton Sundstrand Corporation, Charlotte, NC (US)

(72) Inventor: Pawel Skorupa, Broszewice (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 15/405,593

(22) Filed: Jan. 13, 2017

(65) Prior Publication Data

US 2017/0204985 A1 Jul. 20, 2017

(30) Foreign Application Priority Data

Jan. 15, 2016 (EP) ..................................... 16461503

(51) Int. Cl.
  *F16K 17/00* (2006.01)
  *F16K 27/02* (2006.01)
  *F16K 15/03* (2006.01)

(52) U.S. Cl.
  CPC ........ *F16K 27/0227* (2013.01); *F16K 15/035* (2013.01)

(58) Field of Classification Search
  CPC ........................... F16K 27/0209; F16K 15/038
  USPC ............................ 137/512, 512.1, 527, 527.6
  See application file for complete search history.

(56) References Cited

U.S. PATENT DOCUMENTS

| 195,137 A | 9/1877 | La Baw |
| 479,801 A | 8/1892 | Ginther |
| 1,204,316 A | 11/1916 | Renner |
| 4,007,909 A * | 2/1977 | Buseth ................. F16L 29/007 251/149.2 |
| 5,693,090 A * | 12/1997 | Unsworth ............ A61F 2/2403 137/527 |
| 6,240,957 B1 | 6/2001 | Hattori |
| 2003/0089404 A1 | 5/2003 | Bodnar |

FOREIGN PATENT DOCUMENTS

| DE | 202007017181 U1 | 2/2008 |
| EP | 1312763 A1 | 5/2003 |
| GB | 356317 A | 9/1931 |
| JP | 2010270839 A | 12/2010 |

OTHER PUBLICATIONS

European Search Report for Application No. 16461503.1-1751, dated Jul. 20, 2016, 7 Pages.

\* cited by examiner

*Primary Examiner* — P. Macade Nichols
(74) *Attorney, Agent, or Firm* — Cantor Colburn LLP

(57) ABSTRACT

A check valve comprises a valve housing defining an unobstructed valve opening and a pair of flapper elements each having a proximal end and a distal end. The flapper elements are pivotally mounted to the valve housing at opposed sides of the valve opening at their proximal ends for pivotal movement between a closed position, in which together they block the flow of fluid through the valve opening and an open position in which they permit the flow of fluid through the valve opening. The valve further includes a bumper element arranged at the proximal end of each flapper element for engagement with the valve housing when in the open position for limiting the angle of rotation of each flapper element.

15 Claims, 4 Drawing Sheets

CHECK VALVE

FOREIGN PRIORITY

This application claims priority to European Patent Application No. 16461503.1 filed Jan. 15, 2016, the entire contents of which is incorporated herein by reference.

TECHNICAL FIELD

The present disclosure relates to a check valve.

BACKGROUND

It is known to use check valves to allow fluid flow in one direction therethrough, and to prevent flow in the opposite direction. Check valves are widely used in a wide variety of applications, for example in air conditioning systems, for example in aircraft air conditioning systems.

One form of check valve includes a pair of hinged flappers that pivot open in the direction of fluid flow when the fluid pressure differential exceeds a predetermined valve "cracking pressure". If a negative pressure differential exists across the valve, the flapper elements close, preventing flow reversal.

Such check valves typically include a pair of flapper elements and frequently employ stops or bumpers which restrict the opening movement of the flapper element past a predetermined maximum opening angle.

The present disclosure relates to a check valve of this type.

SUMMARY

Disclosed herein is a check valve comprising a valve housing defining an unobstructed valve opening, a pair of flapper elements each having a proximal end and a distal end, the flapper elements being pivotally mounted to the valve housing at opposed sides of the valve opening at their proximal ends for pivotal movement between a closed position, in which together they block the flow of fluid through the valve opening and an open position in which they permit the flow of fluid through the valve opening, and a bumper element arranged at the proximal end of each flapper element and rotatable therewith for engagement with the valve housing when the flapper element is in the open position for limiting the angle of rotation of each flapper element.

The respective flapper elements may be generally planar in form.

The bumper elements may be configured to limit the angle of rotation of the flapper elements to below 90 degrees.

The flapper elements may be mounted to respective hinge pins supported on the valve housing.

The hinge pins may be supported between respective pairs of mounting posts which extend away from the valve housing.

In certain embodiments, the hinge pins may be fixed with respect to the valve housing, the flapper elements rotating around the hinge pin.

In other embodiments, the hinge pins may be rotatable relative to the valve housing, the flapper elements rotating with the hinge pins.

In certain embodiments, the bumper element may be formed integrally with the flapper element.

In other embodiments, the bumper element may be formed separately from but rotationally coupled to the flapper element.

The bumper element may be coupled to the flapper element via a coupling provided on the hinge pin. The coupling may comprise splines provided on the hinge pin.

The pivot shaft may be provided with splines.

The distal end of one or both flapper elements may include a seal to effect a seal therebetween when the flapper elements are in the closed position.

A seal may be provided between the valve housing around the valve opening and the opposed face of each flapper element.

A sealing element may be provided on the valve housing surrounding the valve opening.

The valve housing is a generally annular member.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
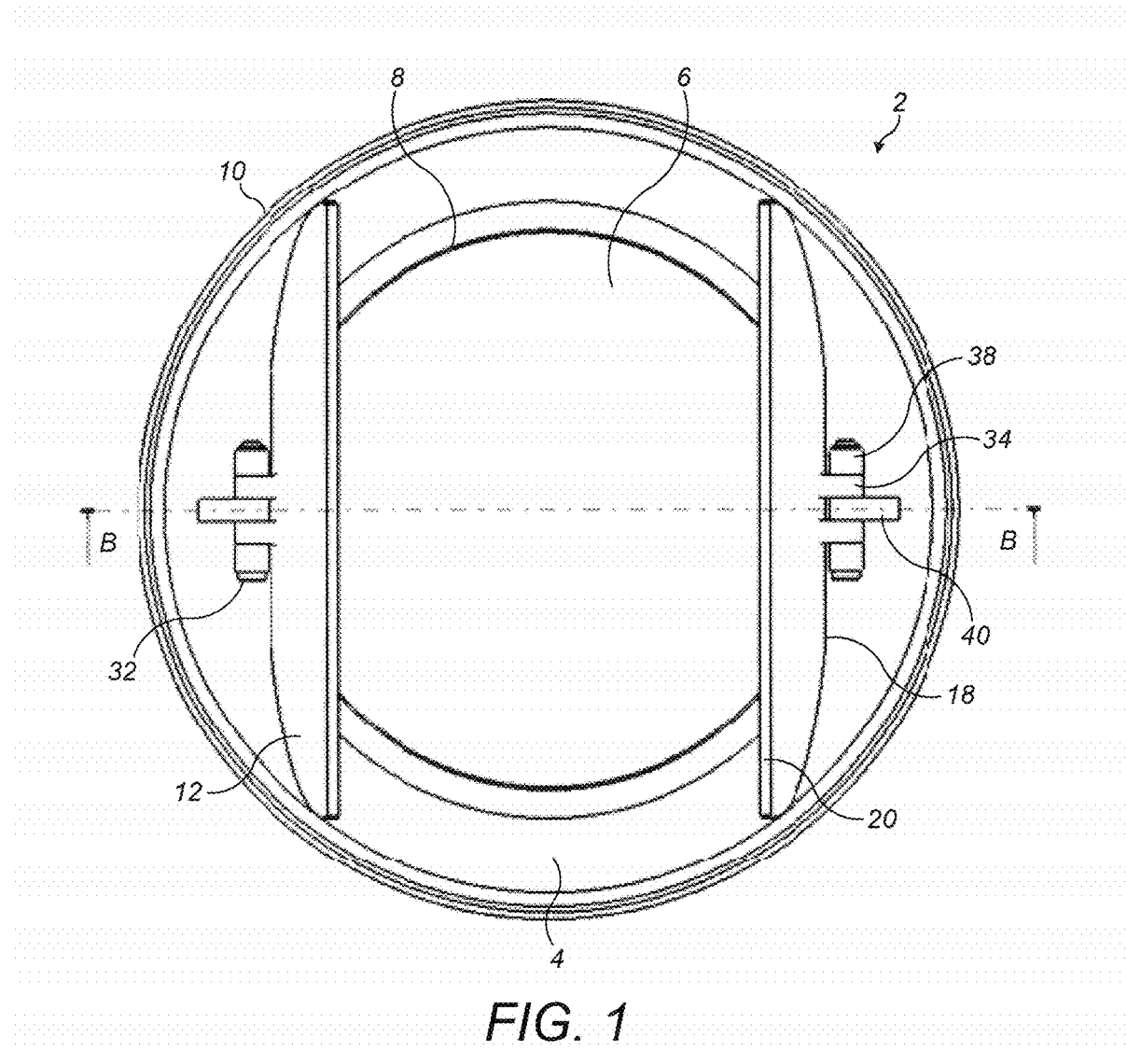
FIG. 1 shows a front view of a first embodiment of check valve in accordance with this disclosure, in a fully open position.
Figure 2:
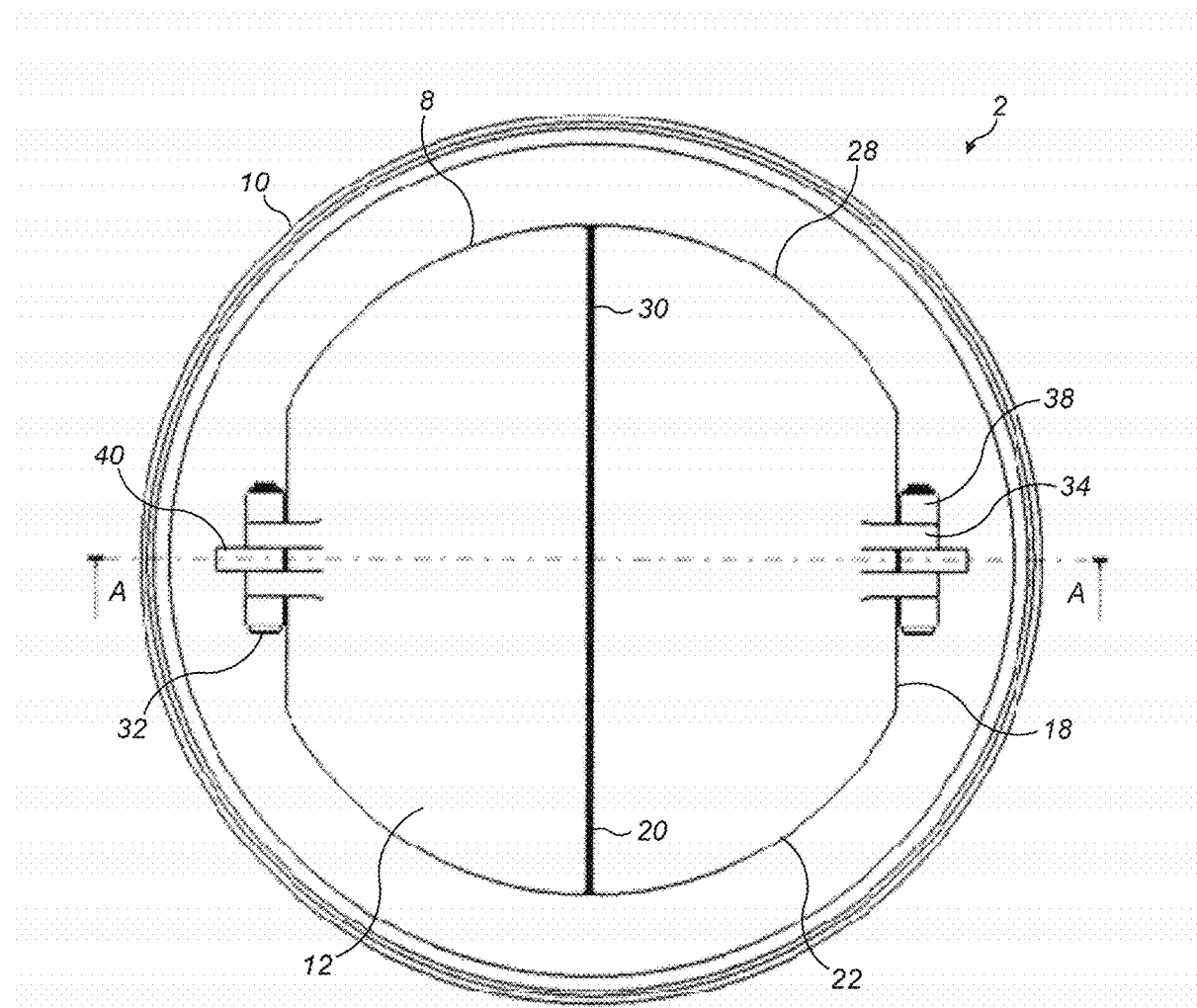
FIG. 2 shows a front view of the check valve of FIG. 1 in a fully closed position.

With reference to FIGS. 1 and 2, a flapper check valve 2 is illustrated. Check valve 2 is configured to be mounted around its periphery in or to, for example, a duct in order to prevent reverse flow of a fluid through the duct. As shown, the check valve 2 comprises a generally planar, annular valve housing 4, defining an unobstructed opening 6 therethrough. It should be understood that 'unobstructed' refers to a valve opening that is free of any obstructions that may restrict the flow therethrough, such as a central mounting bar extending between opposite ends of the valve housing, for example.

As shown in FIG. 2, the opening 6 is generally circular, but with opposed truncated straight side portions. It will be appreciated that the disclosure is not limited to such a shape of valve opening and other shapes fall within the scope of this disclosure. For example, the opening may be generally rectangular in shape. The valve housing 4 includes an annular inner portion 8 and an annular outer portion 10.

The valve 2 further comprises a pair of flapper elements 12 which are pivotally mounted to the valve housing 4. The flapper elements 12 are configured to move between an open position (shown in FIGS. 1 and 3) and a closed position (shown in FIGS. 2 and 4), permitting or preventing flow through the opening 6 respectively.

Each of the flapper elements 12 is generally planar and includes an inner surface 14, an outer surface 16 opposite the inner surface 14, a proximal end 18, a distal end 20 and side ends 22. The proximal end 18 includes a proximal edge 24. The distal end 20 includes a distal edge 26. The sides 22 include side edges 28.

Each flapper element 12 is shaped and mounted such that when the flapper elements 12 are in the closed position, they engage the valve housing 4 around the valve opening 6 and substantially touch at their distal ends 20 in order to close the opening 6.

In the embodiment shown, each flapper element 12 includes a sealing element 30 at its distal end 20. The sealing element 30 may, for example, be a separate sealing element mounted to the distal end 20. A sealing element 30 may be provided on one or both flapper elements 12.

The inner valve housing portion 8 also includes an annular sealing element 30, for example a sealing strip, arranged around the valve opening 6. This improves the seal between the flapper elements 12 and the valve housing 4 when the flappers 12 are in the closed position. Alternatively, a sealing element, for example a sealing strip, may be provided on the inner surface 14 of each flapper element 12.

In an alternative embodiment (not shown), however, no sealant elements may be used, the closure of the opening being effected by contact of the distal ends 20 of the flapper elements 12 with each other and the inner surface 14 of the flapper elements 12 with the valve housing 4 around the valve opening 6.

Each flapper element 12 is pivotally mounted to the valve housing 4 via a hinge pin 32. Each flapper element 12 comprises one or more mounting lugs 34, in this embodiment two mounting lugs 34, at its proximal end 18. The lugs 34 have respective bores 36 which receive the hinge pin 32. The hinge pin 32 is supported in a pair of mounting posts 38 which are mounted to, or are formed integrally, with the valve housing 4 at opposite sides of the valve opening 6.

A bumper element 40 is provided at the proximal end 18 of each flapper element 12 for limiting the rotational movement of the flapper elements 12 in the opening direction.

In this embodiment the bumper element 40 is separate from the flapper element 12, but is mounted so as to rotate with the flapper element 12. To this end, the bumper element 40 is also provided with a bore 36 which is mounted over the hinge pin 32. Suitable rotary coupling means are provided to join the flapper element 12 and the bumper element 40. In this embodiment, the hinge pin 32 has a splined portion (not shown) which extends through both the bores 36 of the flapper element mounting lugs 34 and the bumper element 40, and the bores 36 are splined, thereby rotationally coupling the flapper element 12 and the bumper element 40. Of course, this is just one way in which the bumper element 40 and flapper element 12 may be rotationally coupled, and any suitable coupling means may be used. For example, the various elements may be provided with any form of interlocking formations, or have a non-circular cross section.

The hinge pin 32 is mounted in the mounting posts 38 so as to be rotatable therein so as to permit rotation of the flapper element 12.

The bumper elements 40 are shaped and positioned to prevent the flapper elements 12 from opening beyond a predetermined maximum opening angle. When the flapper element 12 reaches the fully opened position, such that the maximum opening angle has been reached, the bumper elements 40 will contact the valve housing 4 adjacent the proximal end 18 of the flapper element 12. It will be appreciated that the shape of the bumper elements 40 in the embodiment shown are simply exemplary, and any suitably shaped bumper element 40 may be used to stop the flapper elements 12 at the desired maximum opening angle.

Figure 3:
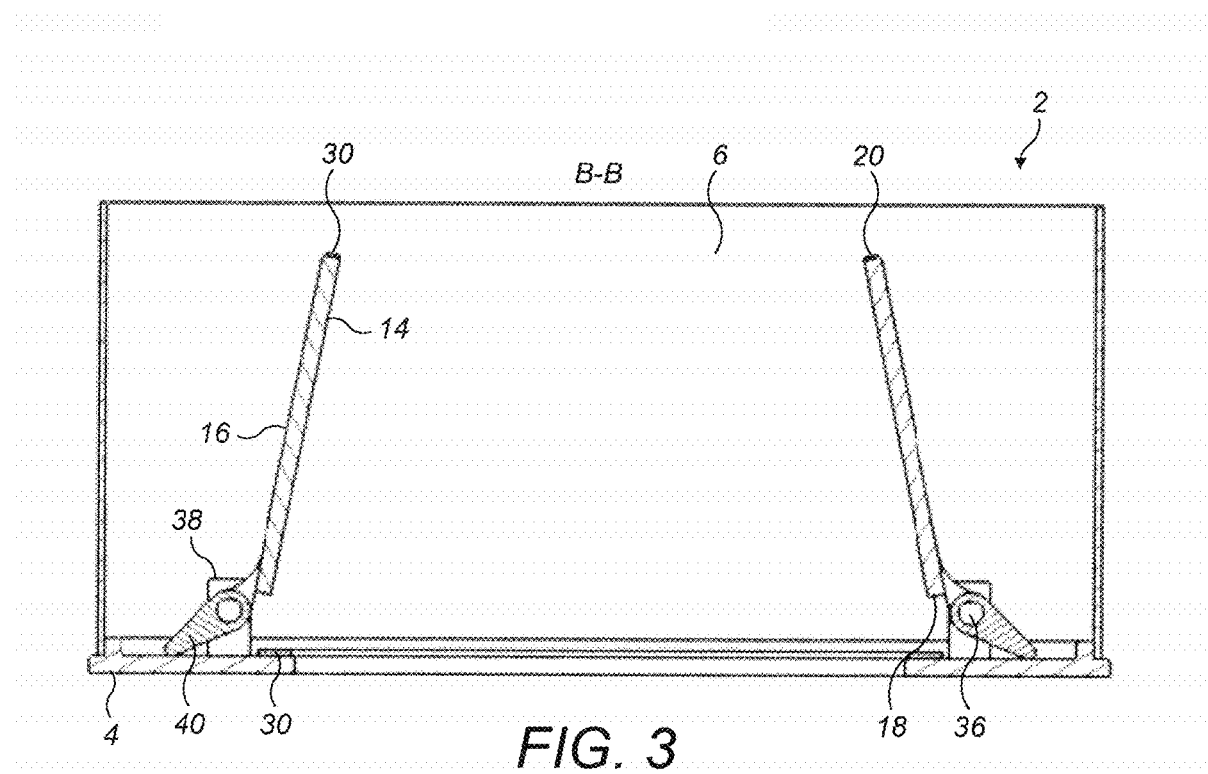
FIG. 3 shows a cross sectional view of the check valve of FIG. 1.
Figure 4:
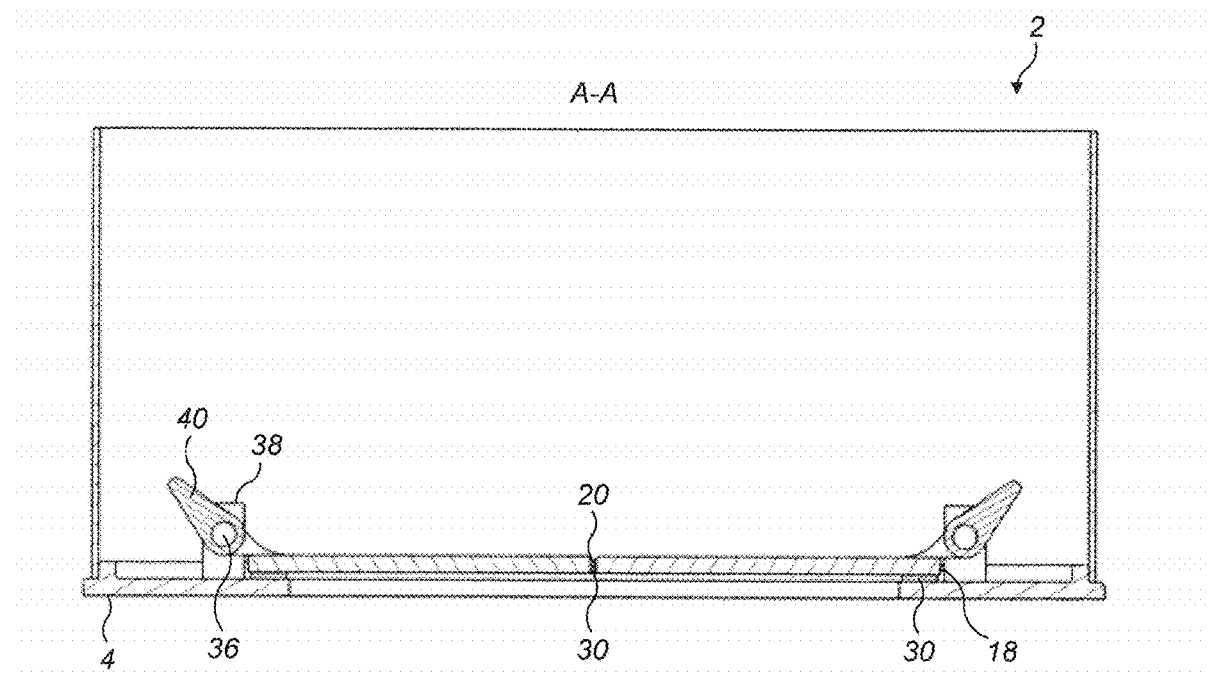
FIG. 4 shows a cross sectional view of the check valve of FIG. 2.

In operation, each of the flapper elements 12 is configured to rotate between a closed position as shown in FIGS. 2 and 4, and a fully open position as shown in FIGS. 1 and 3 (and vice versa). When in the fully open position, the bumper elements 40 engage with the valve housing 4, preventing the flapper elements 12 from moving beyond this angle.

The maximum opening angle may be between 75 and 85 degrees, for example. It will, however, be appreciated that this angle may vary depending upon valve design requirements. However, the maximum operating angle is always below 90 degrees, in order to facilitate operation of the valve 2, as will described below. Additionally, the maximum angle may, for example, be determined or chosen so as to facilitate maximum flow efficiency through the valve 2.

Once the upstream fluid pressure equals that of the predetermined valve cracking pressure, the flapper elements 12 will begin to open, with increased pressure moving the flapper elements 12 into their fully open positions, at which point the bumper elements 40 contact the valve housing. Each flapper element 12 is then held in this position by the upstream fluid pressure.

In the event that an upstream fluid pressure drop is experienced, such that the downstream fluid pressure exceeds the upstream fluid pressure, the flapper elements 12 will be urged back into the closed position as discussed below.

In the embodiment shown, the flapper elements 12 return to the closed position as a result of the downstream fluid pressure acting on the outer surface 16 of each flapper element 12 or by gravity. As a result of the maximum opening angle always being less than 90 degrees, each flapper element 12 is naturally urged into the closed position by the downstream flow pressure acting on the outer surface 16 of the flapper elements 12 or by gravity. Thus, the requirement for an additional biasing member biasing the flapper elements 12 towards their closed position is mitigated, thus greatly simplifying the construction of the valve 2 as a result.

It will be understood that the above is a description of an exemplary embodiment only that modifications may be made thereto within the scope of the disclosure. For example, while sealing elements 30 have been disclosed on the flapper elements 12 and the valve housing 4, these are not essential.

Also, the flapper element 12 may have a single mounting lug 34, rather than two as shown.

Moreover, while the flapper elements 12 and bumper elements 40 are shown in the embodiment as separate elements rotationally coupled together, the bumper element 40 may be integrally formed with the flapper element 12. For example, the bumper element 40 may be formed as part of the mounting lug or lugs 34. Such an embodiment is illustrated in FIGS. 5 and 6.

Figure 5:
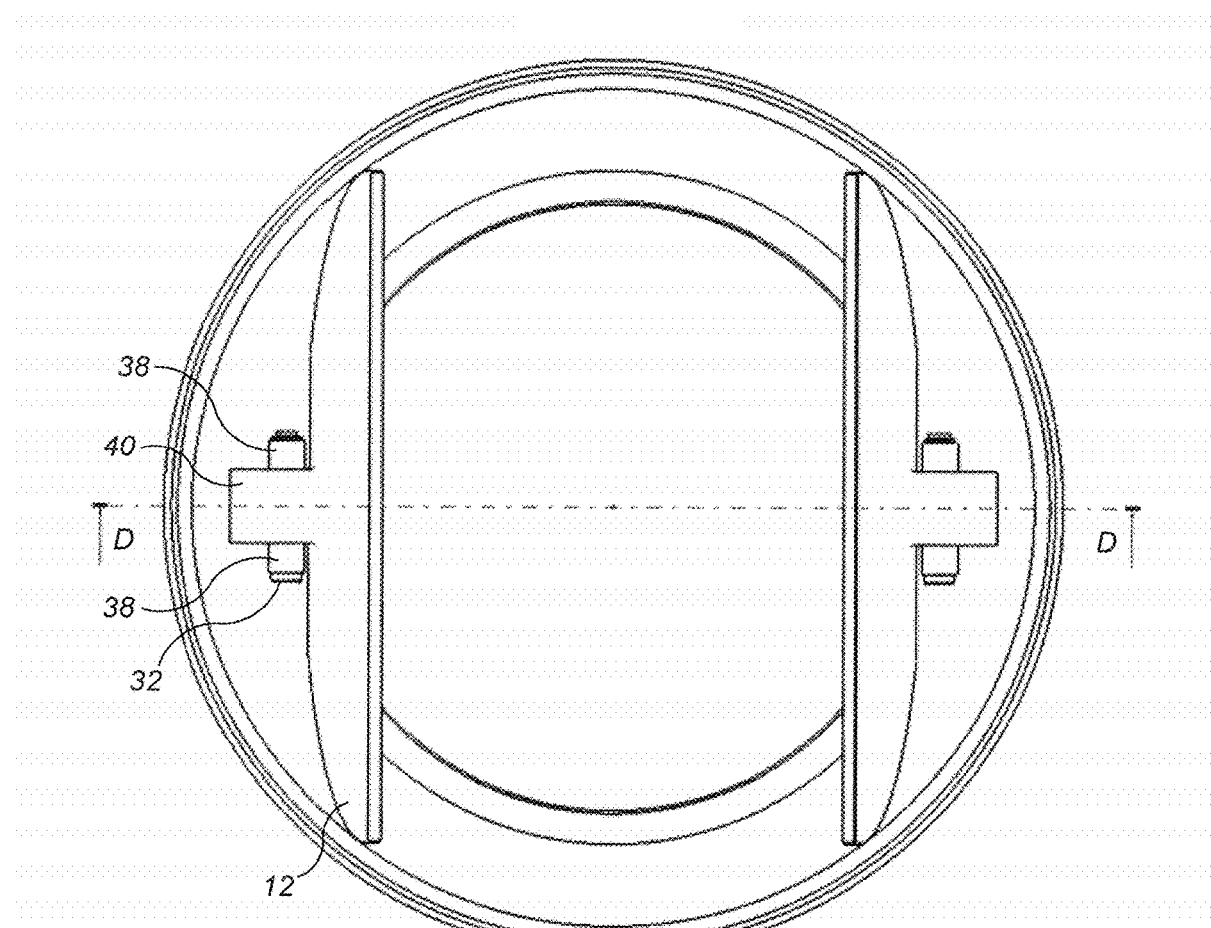
FIG. 5 shows a front view of a second embodiment of check valve in accordance with this disclosure, in a fully open position.
Figure 6:
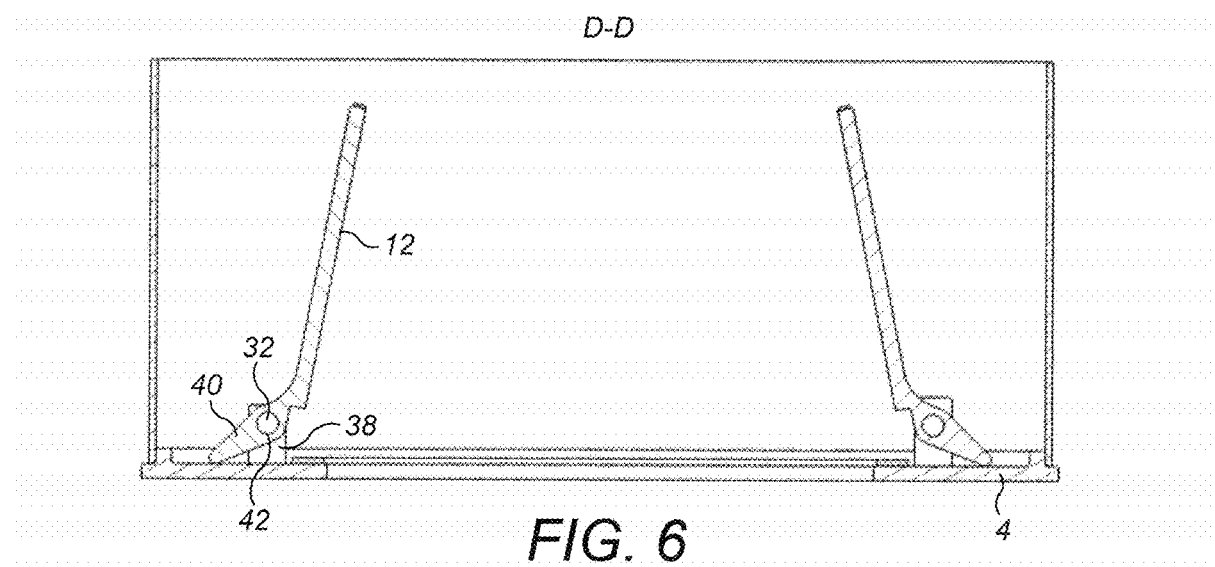
FIG. 6 shows a cross sectional view of the check valve of FIG. 5.

In the embodiment of FIGS. 5 and 6, the bumper element 40 is formed integrally with the flapper element 12. The bumper element 40 projects generally centrally from the proximal end 18 of the flapper element 12 and includes a bore 42 for receiving a hinge pin 32. The hinge pin 32 is suitably mounted between mounting posts 38 of the valve housing 4. The bumper element 40 is received between the mounting posts 38.

In embodiments such as those above, the hinge pin 32 may be rotationally fixed in the mounting posts 38, by suitable means, with the flapper element 12 and bumper element 40 rotating about the hinge pin 32, rather than the flapper elements 12 being fixed to the hinge pin 32 to rotate therewith as in the earlier embodiments. However, the flapper element 12 may be rotationally coupled to the hinge pin 32 which may rotate in the mounting posts 38.

In its other respects, the embodiment of FIGS. 5 and 6 is similar to that of FIGS. 1 to 4, so only the differences between the embodiments have been detailed.

Also, while the bumper 40 is shown as centrally arranged with respect to the flapper element 12 in the embodiments above, this is not essential.

Moreover, in any of the embodiments above, each flapper element 12 may have more than one bumper element 40.

The embodiments illustrated have a number of advantages. They provide an unobstructed valve opening, providing a large flow area and a lower pressure drop. Also, the construction is simple, as it does not include any spring biasing means for biasing the flapper elements toward their closed position.

Although the figures and the accompanying description describe particular embodiments and examples, it is to be understood that the scope of this disclosure is not to be limited to such specific embodiments, and is, instead, to be determined by the following claims.

The invention claimed is:

1. A check valve comprising:
a valve housing defining an unobstructed valve opening;
a pair of flapper elements each having a proximal end and a distal end, the flapper elements being pivotally mounted to the valve housing at opposed sides of the valve opening at their proximal ends for pivotal movement between a closed position, in which together they block the flow of fluid through the valve opening and an open position in which they permit the flow of fluid through the valve opening; and
a bumper element arranged at the proximal end of each flapper element and rotatable therewith for engagement with the valve housing when the flapper element is in the open position, for limiting the angle of rotation of each flapper element;
wherein the flapper elements are mounted to respective hinge pins supported on the valve housing.

2. The check valve of claim 1, wherein the respective flapper elements are generally planar in form.

3. The check valve of claim 1, wherein the bumper elements are configured to limit the angle of rotation of the flapper elements to below 90 degrees.

4. The check valve of claim 1, wherein the hinge pins are supported between respective pairs of mounting posts which extend away from the valve housing.

5. The check valve of claim 1, wherein the hinge pins are fixed with respect to the valve housing, the flapper elements rotating around the hinge pin.

6. The check valve of claim 1, wherein the hinge pins are rotatable relative to the valve housing, the flapper elements rotating with the hinge pins.

7. The check valve of claim 1, wherein the bumper element is formed integrally with the flapper element.

8. The check valve of claim 1, wherein the bumper element is formed separately from but rotationally coupled to the flapper element.

9. The check valve of claim 8, wherein the bumper element is coupled to the flapper element via a coupling provided on the hinge pin.

10. The check valve of claim 9, wherein the coupling comprises splines provided on the hinge pin.

11. The check valve of claim 1, wherein the distal end of one or both flapper elements include a seal to effect a seal therebetween when the flapper elements are in the closed position.

12. The check valve of claim 1, further comprising a seal provided between the valve housing around the valve opening and the opposed face of each flapper element.

13. The check valve of claim 12, wherein a sealing element is provided on the valve housing surrounding the valve opening.

14. The check valve of claim 1, wherein the valve housing is a generally annular member.

15. The check valve of claim 1, wherein each bumper element extends away from its respective hinge pin in a direction away from its respective flapper element.

* * * * *